(12) United States Patent
Lee et al.

(10) Patent No.: US 11,228,755 B2
(45) Date of Patent: Jan. 18, 2022

(54) METHOD AND APPARATUS FOR PROCESSING INTRA-PREDICTION-BASED VIDEO SIGNAL

(71) Applicant: Industry Academy Cooperation Foundation of Sejong University, Seoul (KR)

(72) Inventors: Yung Lyul Lee, Seoul (KR); Nam Uk Kim, Seoul (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 16/085,724

(22) PCT Filed: Mar. 17, 2017

(86) PCT No.: PCT/KR2017/002899
§ 371 (c)(1),
(2) Date: Sep. 17, 2018

(87) PCT Pub. No.: WO2017/160117
PCT Pub. Date: Sep. 21, 2017

(65) Prior Publication Data
US 2019/0104304 A1 Apr. 4, 2019

(30) Foreign Application Priority Data
Mar. 17, 2016 (KR) .......................... 10-2016-0032142

(51) Int. Cl.
H04N 19/11 (2014.01)
H04N 19/105 (2014.01)
(Continued)

(52) U.S. Cl.
CPC ........... H04N 19/11 (2014.11); H04N 19/105 (2014.11); H04N 19/117 (2014.11);
(Continued)

(58) Field of Classification Search
CPC ........ H04N 10/00; H04N 19/00; H04N 19/11; H04N 19/105; H04N 19/593; H04N 19/159
See application file for complete search history.

(56) References Cited

U.S. PATENT DOCUMENTS 9,467,692 B2 * 10/2016 Rapaka ................ H04N 19/105
2014/0092980 A1 * 4/2014 Guo ..................... H04N 19/593
375/240.16

FOREIGN PATENT DOCUMENTS

KR  10-2008-0069069 A  7/2008
KR  10-2014-0057511 A  5/2014
(Continued)

OTHER PUBLICATIONS

International Search Report dated Jun. 13, 2017, in corresponding International Application No. PCT/KR2017/002899 (4 pages in English, 4 pages in Korean).

Primary Examiner — Kyle M Lotfi
(74) Attorney, Agent, or Firm — NSIP Law

(57) ABSTRACT

According to the present invention, provided is a method of processing a video signal, the method including: obtaining a transform coefficient of a current block from a bitstream according to a predetermined scanning order; determining an intra prediction mode of the current block on the basis of the transform coefficient; and performing intra prediction on the current block using the intra prediction mode and a neighboring sample adjacent to the current block.

11 Claims, 6 Drawing Sheets

(51) Int. Cl.
*H04N 19/593* (2014.01)
*H04N 19/159* (2014.01)
*H04N 19/176* (2014.01)
*H04N 19/117* (2014.01)
*H04N 19/182* (2014.01)
*H04N 19/167* (2014.01)
*H04N 19/82* (2014.01)

(52) U.S. Cl.
CPC ......... *H04N 19/159* (2014.11); *H04N 19/167* (2014.11); *H04N 19/176* (2014.11); *H04N 19/182* (2014.11); *H04N 19/593* (2014.11); *H04N 19/82* (2014.11)

(56) References Cited

FOREIGN PATENT DOCUMENTS

| | | |
|---|---|---|
| KR | 10-2015-0029001 A | 3/2015 |
| KR | 10-2015-0093633 A | 8/2015 |
| KR | 10-2015-0095232 A | 8/2015 |
| WO | WO 2012/096150 A1 | 7/2012 |

\* cited by examiner (a)

(b)

(c)

METHOD AND APPARATUS FOR PROCESSING INTRA-PREDICTION-BASED VIDEO SIGNAL

CROSS REFERENCE TO RELATED APPLICATION(S)

This application is a U.S. National Stage Application of International Application No. PCT/KR2017/002899, filed on Mar. 17, 2017, which claims the benefit under 35 USC 119(a) and 365(b) of Korean Patent Application No. 10-2016-0032142, filed on Mar. 17, 2016, in the Korean Intellectual Property Office.

TECHNICAL FIELD

The present invention relates to a method and apparatus for processing a video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and apparatus for rapid intra prediction coding in encoding/decoding a video signal.

Another object of the present invention is to provide a method and apparatus for performing intra prediction based on a filter in encoding/decoding a video signal.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

According to the present invention, there is provided a method of decoding a video signal, the method including: determining an intra prediction mode of a current block; performing first intra prediction on the current block based on the intra prediction mode and a reference pixel adjacent to the current block; and performing second intra prediction on the current block based on the reference pixel and a first prediction sample derived through the first intra prediction.

In the method of decoding the video signal according to the present invention, the second intra prediction may be performed by applying a filter to the reference pixel and the first prediction sample.

In the method of decoding the video signal according to the present invention, when the first prediction sample is positioned on a diagonal line of the current block, the filter may be applied to the first prediction sample, the reference pixel positioned at a top of the current block, and the reference pixel positioned at a left of the current block.

In the method of decoding the video signal according to the present invention, when the first prediction sample is positioned at a right of a diagonal line of the current block, the filter may be applied to the first prediction sample and the reference pixel positioned at a top of the current block.

In the method of decoding the video signal according to the present invention, when the first prediction sample is positioned below a diagonal line of the current block, the filter may be applied to the first prediction sample and the reference pixel positioned at a left of the current block.

In the method of decoding the video signal according to the present invention, a coefficient of the filter may be determined depending on a position of the first prediction sample.

In the method of decoding the video signal according to the present invention, as an x-axis coordinate or a y-axis coordinate of the first prediction sample increases, a weighting of the filter to be assigned to the first prediction sample may increase.

In the method of decoding the video signal according to the present invention, when the intra prediction mode of the current block is a planar mode, the first intra prediction may be performed on the basis of a top reference pixel, a left reference pixel, a top right reference pixel, and a bottom left reference pixel that are adjacent to the current block.

In the method of decoding the video signal according to the present invention, a value of the top right reference pixel may be equal to a value of the reference pixel adjacent to the top right reference pixel, and a value of the bottom left reference pixel may be equal to a value of the reference pixel adjacent to the bottom left reference pixel.

In the method of decoding the video signal according to the present invention, when the current block includes multiple sub-blocks, the first intra prediction and the second intra prediction may be performed on a per-sub-block basis.

In the method of decoding the video signal according to the present invention, an order of performing the first intra prediction and the second intra prediction may be determined depending on the intra prediction mode of the current block.

According to the present invention, there is provided an apparatus for decoding a video signal, the apparatus including an intra prediction module configured to: determine an intra prediction mode of a current block; perform first intra prediction on the current block based on the intra prediction mode and a reference pixel adjacent to the current block; and perform second intra prediction on the current block based on the reference pixel and a first prediction sample derived through the first intra prediction.

It is to be understood that the foregoing summarized features are exemplary aspects of the following detailed description of the present invention without limiting the scope of the present invention.

Advantageous Effects

According to the present invention, rapid intra prediction encoding/decoding is possible.

According to the present invention, intra prediction based on a filter is effectively performed.

Effects that may be obtained from the present invention will not be limited to only the above described effects. In addition, other effects which are not described herein will become apparent to those skilled in the art from the following description.

MODE FOR INVENTION

Figure 1:
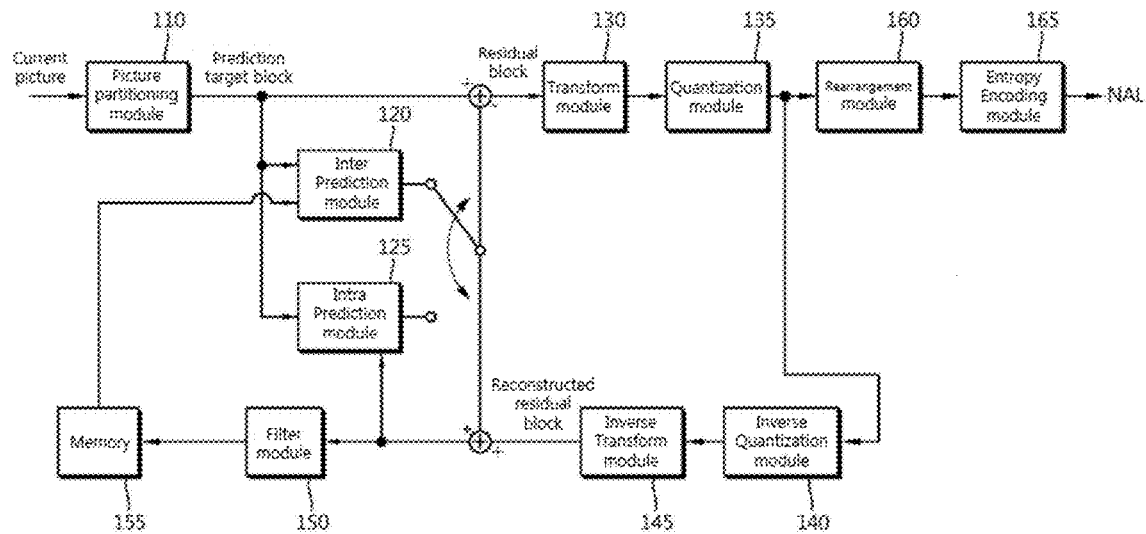
FIG. 1 is a block diagram illustrating an apparatus for encoding an image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating an apparatus for encoding an image according to an embodiment of the present invention.

Referring to FIG. 1, the apparatus 100 for encoding an image may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the apparatus for encoding the image. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (for example, cost function).

For example, one picture may be partitioned into multiple coding units. A recursive tree structure, such as a quad tree structure, may be used to partition a picture into coding units. A coding unit which is partitioned into other coding units with one image or a largest coding unit as a root may be partitioned with child nodes corresponding to the number of partitioned coding units. A coding unit which is no longer partitioned according to a predetermined limitation serves as a leaf node. That is, when it is assumed that only square partitioning is possible for one coding unit, one coding unit is partitioned into four other coding units at most.

Hereinafter, in the embodiment of the present invention, the coding unit may mean a unit performing encoding, or a unit performing decoding.

One or more prediction units in the same size square shape or rectangular shape may be obtained by partitioning a single coding unit. Alternatively, a single coding unit may be partitioned into prediction units in such a manner that one prediction unit may be different from another prediction unit in shape and/or size.

When a prediction unit subjected to intra prediction based on a coding unit is generated and the coding unit is not the smallest coding unit, intra prediction is performed without partitioning into multiple prediction units N×N.

The prediction modules 120 and 125 may include an inter prediction module 120 performing inter prediction and an intra prediction module 125 performing intra prediction. Whether to perform inter prediction or intra prediction for the prediction may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit. A residual value (residual block) between the generated prediction block and an original block may be input to the transform module 130. Also, prediction mode information used for prediction, motion vector information, and the like may be encoded with the residual value by the entropy encoding module 165 and may be transmitted to an apparatus for decoding. When a particular encoding mode is used, the original block is intactly encoded and transmitted to a decoding module without generating the prediction block by the prediction modules 120 and 125.

The inter prediction module 120 may predict the prediction unit on the basis of information on at least one of a previous picture or a subsequent picture of the current picture, or may prediction the prediction unit on the basis of information on some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or -¼ pixel basis on the basis of the interpolated pixel. The motion prediction module may predict a current prediction unit by changing the motion prediction method. As motion prediction methods, various methods, such as a skip method, a merge method, an advanced motion vector prediction (AMVP) method, an intra block copy method, and the like may be used.

The intra prediction module 125 may generate a prediction unit on the basis of reference pixel information neighboring a current block, which is pixel information in the current picture. When the neighboring block of the current prediction unit is a block subjected to inter prediction and thus a reference pixel is a pixel subjected to inter prediction, reference pixel information of a neighboring block subjected to intra prediction is used instead of the reference pixel included in the block subjected to inter prediction. That is, when a reference pixel is unavailable, at least one reference pixel of available reference pixels is used instead of unavailable reference pixel information.

Prediction modes in intra prediction may include a directional prediction mode using reference pixel information depending on a prediction direction and a non-directional mode not using directional information in performing prediction. The number of directional prediction modes may be equal to or greater than 33 defined in the HEVC standard, and for example, may extend to the number ranging 60 to 70. A mode for prediction luma information may be different from a model for predicting chroma information, and in order to predict the chroma information, intra prediction mode information used to predict the luma information or predicted luma signal information may be utilized.

In performing intra prediction, when the prediction unit is the same as the transform unit in size, intra prediction is performed on the prediction unit on the basis of the pixels positioned at the left, the top left, and the top of the prediction unit. However, in performing intra prediction, when the prediction unit is different from the transform unit in size, intra prediction is performed using a reference pixel based on the transform unit. Also, intra prediction using N×N partitioning only for the smallest coding unit may be used.

In the intra prediction method, a prediction block may be generated after applying an adaptive intra smoothing (AIS) filter to a reference pixel depending on the prediction modes. The type of AIS filter applied to the reference pixel may vary. In order to perform the intra prediction method, an intra prediction mode of the current prediction unit may be predicted from the intra prediction mode of the prediction unit neighboring the current prediction unit. In predicting the prediction mode of the current prediction unit by using mode information predicted from the neighboring prediction unit, when the intra prediction mode of the current prediction unit is the same as the intra prediction mode of the neighboring prediction unit, information indicating that the current prediction unit and the neighboring prediction unit have the same prediction mode is transmitted using predetermined flag information. When the prediction mode of the current prediction unit is different from the prediction mode of the neighboring prediction unit, entropy encoding is performed to encode prediction mode information of the current block.

Also, a residual block may be generated on the basis of prediction units generated by the prediction modules 120 and 125, wherein the residual block includes information on a residual value which is a difference value between the prediction unit subjected to prediction and the original block of the prediction unit. The generated residual block may be input to the transform module 130.

The transform module 130 may transform the residual block, which includes the information on the residual value between the original block and the prediction units generated by the prediction modules 120 and 125, by using a transform method, such as discrete cosine transform (DCT), discrete sine transform (DST), and KLT. Whether to apply DCT, DST, or KLT in order to transform the residual block may be determined on the basis of intra prediction mode information of the prediction unit which is used to generate the residual block.

The quantization module 135 may quantize values transformed into a frequency domain by the transform module 130. Quantization coefficients may vary depending on a block or importance of an image. The values calculated by the quantization module 135 may be provided to the inverse quantization module 140 and the rearrangement module 160.

The rearrangement module 160 may perform rearrangement of coefficient values with respect to quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vector. Depending on the size of the transform unit and the intra prediction mode, vertical direction scanning where coefficients in the form of two-dimensional block are scanned in the column direction or horizontal direction scanning where coefficients in the form of two-dimensional block are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAL).

The entropy encoding module 165 may encode a variety of information, such as residual value coefficient information and block type information of the coding unit, prediction mode information, partition unit information, prediction unit information, transmission unit information, motion vector information, reference frame information, block interpolation information, filtering information, and the like from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation unit, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering strength. Also, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, used is a method of partitioning pixels of the image into the predetermined number of regions, determining a region to be subjected to offset, and applying the offset to the determined region or a method of applying an offset in consideration of edge information of each pixel.

Adaptive loop filtering (ALF) may be performed on the basis of the value obtained by comparing the filtered reconstructed image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU). The form and filter coefficient of a filter for ALF to be applied may vary depending on each block. Also, the filter for ALF in the same form (fixed form) may be applied regardless of the characteristic of the application target block.

The memory 155 may store the reconstructed block of the picture calculated through the filter module 150. The stored reconstructed block or picture may be provided to the prediction modules 120 and 125 in performing inter prediction.

Figure 2:
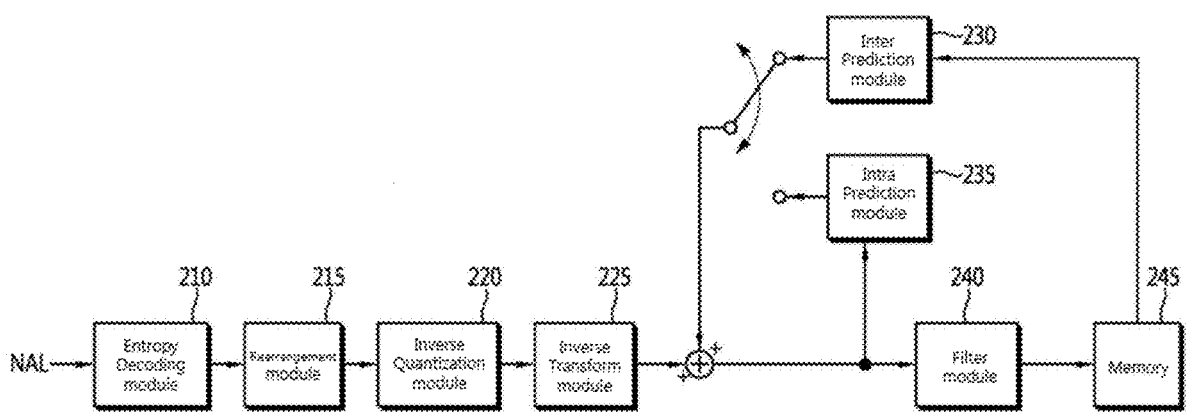
FIG. 2 is a block diagram illustrating an apparatus for decoding an image according to an embodiment of the present invention.

FIG. 2 is a block diagram illustrating an apparatus for decoding an image according to an embodiment of the present invention.

Referring to FIG. 2, the apparatus 200 for decoding an image may include: an entropy decoding module 210, a rearrangement module 215, an inverse quantization module 220, an inverse transform module 225, prediction modules 230 and 235, a filter module 240, and a memory 245.

When an image bitstream is input from the apparatus for encoding the image, the input bitstream is decoded according to an inverse process of the apparatus for encoding the image.

The entropy decoding module 210 may perform entropy decoding according to the inverse process of the entropy encoding by the entropy encoding module of the apparatus for encoding the image. For example, corresponding to the methods performed by the apparatus for encoding the image, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the apparatus for encoding.

The rearrangement module 215 may perform rearrangement on the bitstream entropy decoded by the entropy decoding module 210 on the basis of the rearrangement method used in the apparatus for encoding. The coefficients expressed in the form of the one-dimensional vector may be reconstructed and rearranged into the coefficients in the form of the two-dimensional block. The rearrangement module 215 may perform rearrangement through a method of receiving information related to coefficient scanning performed in the apparatus for encoding and of inversely scanning on the basis of the scanning order performed in the apparatus for encoding.

The inverse quantization module 220 may perform inverse quantization on the basis of a quantization parameter received from the apparatus for encoding and the rearranged coefficient values of the block.

The inverse transform module 225 may perform, on the quantization result obtained by the apparatus for encoding the image, inverse transform, namely, inverse DCT, inverse DST, and inverse KLT that are the inverse of transform, which is DCT, DST, and KLT, performed by the transform module. Inverse transform may be performed on the basis of a transmission unit determined by the apparatus for encoding the image. The inverse transform module 225 of the apparatus for decoding the image may selectively perform transform techniques (for example, DCT, DST, and KLT) depending on multiple pieces of information, such as the prediction method, the size of the current block, the prediction direction, and the like.

The prediction modules 230 and 235 may generate a prediction block on the basis of information on prediction block generation received from the entropy decoding module 210 and information on a previously decoded block or picture received from the memory 245.

As described above, like operation of the apparatus for encoding the image, in performing intra prediction, when the prediction unit is the same as the transform unit in size, intra prediction is performed on the prediction unit on the basis of the pixels positioned at the left, the top left, and the top of the prediction unit. However, in performing intra prediction, when the prediction unit is different from the transform unit in size, intra prediction is performed using a reference pixel based on the transform unit. Also, intra prediction using N×N partitioning only for the smallest coding unit may be used.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, and the like from the entropy decoding module 210, may distinguish a prediction unit in a current coding unit, and may determine whether inter prediction or intra prediction is performed on the prediction unit. By using information required in inter prediction of the current prediction unit received from the apparatus for encoding the image, the inter prediction module 230 may perform inter prediction on the current prediction unit on the basis of information of at least one of a previous picture or a subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, an AMVP mode, and an intra block copy mode is used as the motion prediction method of the prediction unit included in the coding unit, on the basis of the coding unit.

The intra prediction module 235 may generate a prediction block on the basis of pixel information in the current picture. When the prediction unit is a prediction unit subjected to intra prediction, intra prediction is performed on the basis of intra prediction mode information of the prediction unit received from the apparatus for encoding the image. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. The prediction mode of the prediction unit received from the apparatus for encoding the image and AIS filter information are used in performing AIS filtering on the reference pixel of the current block. When the prediction mode of the current block is not a mode in which AIS filtering is not performed, the AIS filter is not applied.

When the prediction mode of the prediction unit is a prediction mode in which intra prediction is performed on the basis of the pixel value obtained by interpolating the reference pixel, the reference pixel interpolation module may interpolate the reference pixel to generate the reference pixel in units of a pixel of an integer value or less. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

From the apparatus for encoding the image, received is information on whether the deblocking filter is applied to the relevant block or picture and information on whether a strong filter or a weak filter is applied when the deblocking filter is applied. The deblocking filter of the apparatus for decoding the image may receive information on the deblocking filter from the apparatus for encoding the image, and the apparatus for decoding the image may perform deblocking filtering on the relevant block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the apparatus for encoding. The ALF information may be provided as being included in a particular parameter set.

The memory 245 may store the reconstructed picture or block for use as a reference picture or a reference block, and may provide the reconstructed picture to an output module.

As described above, hereinafter, in the embodiment of the present invention, for convenience of description, the coding unit is used as a term representing encoding unit, but the coding unit may serve as a unit performing decoding as well as encoding.

Figure 3:
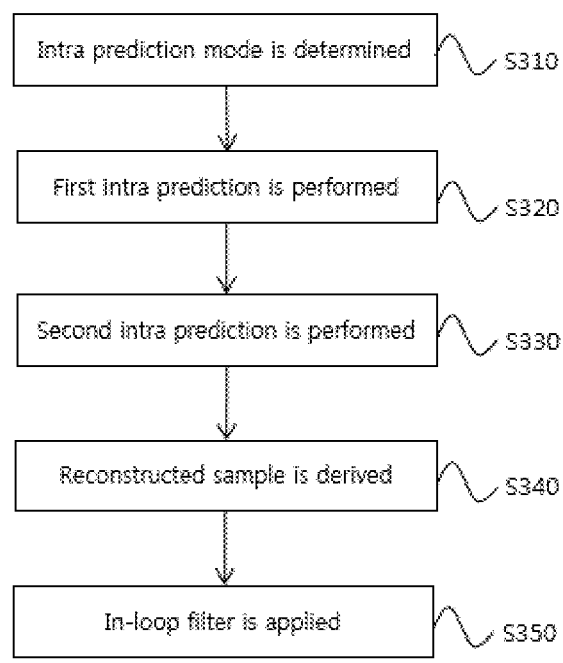
FIG. 3 is a diagram illustrating a method of decoding an image on the basis of intra prediction according to an embodiment of the present invention.

FIG. 3 is a diagram illustrating a method of decoding an image on the basis of intra prediction according to an embodiment of the present invention.

Hereinafter, for convenience of description, embodiments will be described based on 35 intra prediction modes defined in HEVC. However, even when 35 or more intra prediction modes (namely, extended intra prediction modes) are used, the following embodiments described below are applicable. Also, in the following embodiments, the point of the smallest unit constituting the image is referred to as a pixel, a sample, or the like.

Referring to FIG. 3, when the current block is a block encoded in the intra mode, the intra prediction mode of the current block is determined at step S310.

The intra prediction mode of the current block may be determined with reference to the intra prediction mode of the neighboring block adjacent to the current block. For example, in order to determine the intra prediction mode of the current block, the intra prediction mode of the neighboring block adjacent to the current block is referenced such that a candidate mode list is generated. Next, on the basis of an index (for example, a most probable mode (MPM) index) indicating one of the intra prediction modes included in the candidate mode list, the intra prediction mode of the current block may be determined, or the intra prediction mode which is not included in the candidate mode list may be determined as the intra prediction mode of the current block.

When the intra prediction mode of the current block is determined, first intra prediction is performed on the basis of information on the reference pixel adjacent to the current block at step S320. Here, at least one pixel included in the neighboring block adjacent to the current block may be used as a reference pixel for intra prediction of the current block.

The neighboring block may include at least one of blocks adjacent to the bottom left, the left, the top left, the top, the top right, the right, and the bottom of the current block. When the reference pixel is unavailable, information on the unavailable reference pixel is substituted by information on available reference pixel. Availability of the reference pixel may be determined on the basis of whether the neighboring block including the reference pixel is decoded before the current block, whether the neighboring block including the reference pixel is a block encoded in the inter mode, whether the reference pixel is included in the same slice or tile as the current block, and the like.

Through first intra prediction, a first prediction sample of the current block may be derived. Hereinafter, assuming that the intra prediction mode of the current block is a planar mode, a process of deriving the first prediction sample of the current block will be described.

When the intra prediction mode of the current block is the planar mode, a first prediction value (namely, the value of the first prediction sample) of a target sample included in the current block is derived using at least one of a first reference pixel which varies depending on the position of the target sample and a second reference pixel which is fixed regardless of the position of the target sample. Here, the first reference pixel may include at least one of a reference pixel (namely, the reference pixel with the same x-coordinate value as the target sample) positioned on the same horizontal line as the target sample and a reference pixel (namely, the reference pixel with the same y-coordinate value as the target sample) positioned on the same vertical line as the target sample. The second reference pixel may include at least one of reference pixels positioned in a diagonal direction from the corner at the current block (for example, the top right reference pixel and the bottom left reference pixel). Alternatively, the second reference pixel may include at least one selected from a group of: the rightmost pixel among multiple neighboring pixels adjacent to the top boundary of the current block; the bottommost pixel among multiple neighboring pixels adjacent to the left boundary of the current block; and a neighboring pixel adjacent to the top right corner of the current block.

Figure 4:
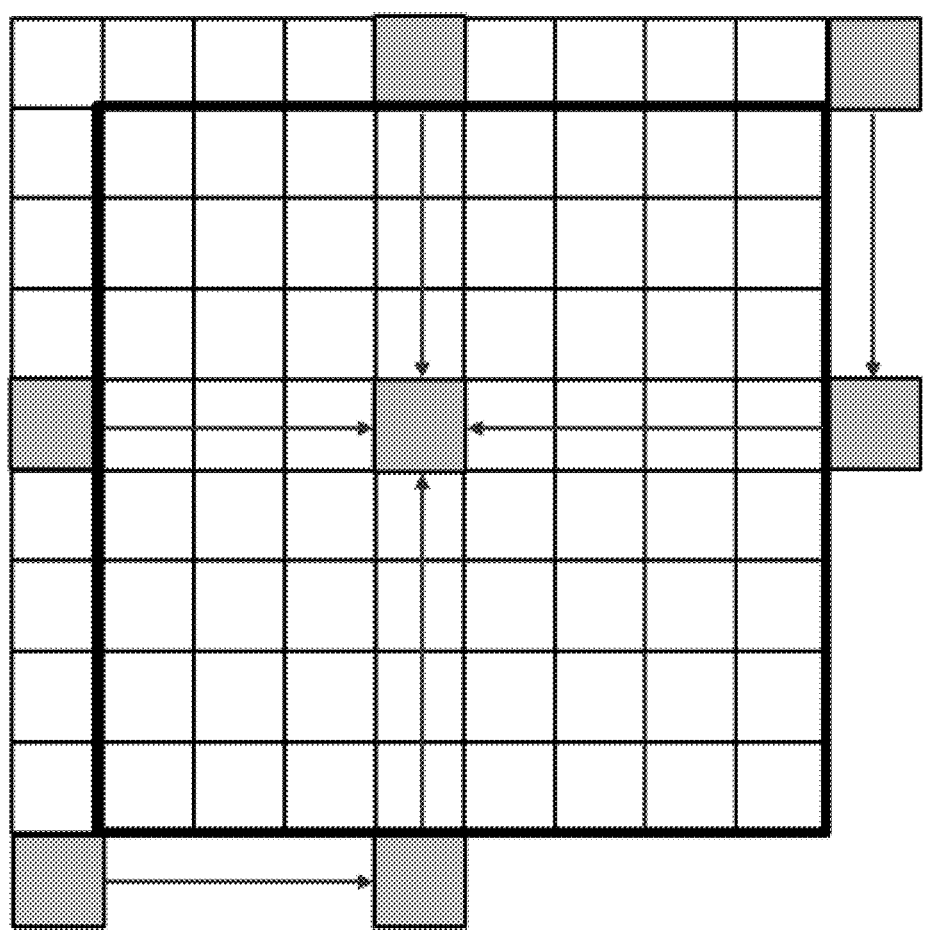
FIG. 4 is a diagram illustrating an example of a process of deriving a first prediction value of a target sample.

FIG. 4 is a diagram illustrating an example of a process of deriving the first prediction value of the target sample. In the example shown in FIG. 4, it is assumed that an 8×8 block shown in bold lines represents the current block and samples outside the bold lines are reference pixels adjacent to the current block. For convenience of description, the reference pixel positioned in the diagonal direction from the top right corner of the current block is referred to as the top right reference pixel, and the reference pixel positioned in the diagonal direction from the bottom left corner of the current block is referred to as the bottom left reference pixel.

Referring to FIG. 4, when the top left sample of the current block has the coordinates (0, 0), the first prediction sample of the target sample positioned at the coordinates (3, 3) of the current block is derived on the basis of the reference pixel positioned on the same horizontal line as the target sample (namely, the reference pixel positioned at the coordinates (−1, 3)), the bottom left reference pixel (namely, the reference pixel positioned at the coordinates (−1, 8)), the reference pixel positioned on the same vertical line as the target sample (namely, the reference pixel positioned at the coordinates (3, −1)), and the top right reference pixel (namely, the reference pixel positioned at the coordinates (8, −1)).

The method of deriving the first prediction value of the target sample may be expressed as Equation 1 below.

$$horPred(x, y) = \\ (nT - 1 - x) \times p(-1, y) + (x + 1) \times p(nT, -1) \\ verPred(x, y) = (nT - 1 - y) \times p(x, -1) + \\ (y + 1) \times p(-1, nT) \\ predSamples(x, y) = (horPred(x, y) + \\ verPred(x, y) + nT) >> (Log2(nT) + 1)$$

[Equation 1]

In Equation 1, nT denotes the size or the horizontal/vertical length of the current block, and p(−1, y) and p(x, −1) denote pixel values of the reference pixels. As specified in Equation 1, the first prediction value (predsample(x,y)) of the target sample may be derived on the basis of the sum of a horizontal prediction value (horPred(x,y)), which is based on the top reference pixel with the same x-axis coordinate as the target sample and on the bottom left reference pixel, and of a vertical prediction value (verPred(x,y)), which is based on the left reference pixel with the same y-axis coordinate as the target sample and on the top right reference pixel.

Here, the first prediction value of the edge sample of the current block may be derived using the value of the reference pixel adjacent to the second reference pixel instead of the value of the second reference pixel. Here, the edge sample of the current block may mean a sample in contact with the edge (boundary) of the current block, among samples of current block. For example, the edge sample may be the sample positioned on the rightmost column and/or the bottommost row of the current block.

For example, according to Equation 1, the horizontal prediction value of the right edge sample (namely, the sample at the coordinates (7, y)) of the current block may be derived using only the top right reference pixel as shown in Equation 2 below.

$$horPred(7, y) = \qquad \text{[Equation 2]}$$
$$(8 - 1 - 7) \times p(-1, y) + (7 + 1) \times p(8, -1) = 8p(8, -1)$$

However, there is a higher probability that the edge sample (hereinafter, referred to as the rightmost sample) positioned on the rightmost column of the current block has similarity to the reference pixel (namely, the coordinates (7, −1)) positioned on the same x-axis as the rightmost sample, than similarity to the reference pixel (namely, the coordinates (8, −1)) adjacent to the top right of the current block.

Also, instead of the top right reference pixel of the current block, the reference pixel (namely, the coordinates (7, −1)) positioned on the same vertical line as the rightmost sample may be used to derive a horizontal prediction value of the rightmost sample.

Further, instead of the bottom left reference pixel, on the basis of the value of the reference pixel (namely, the reference pixel at the coordinates (−1, 7) which has the same y coordinate as the bottommost row of the current block) adjacent to the bottom left reference pixel, a vertical prediction value of the rightmost sample may be derived.

Similarly, the vertical prediction value of the edge sample (hereinafter, referred to as the bottommost sample) positioned on the bottommost row of the current block may be derived using the reference pixel (namely, the reference pixel at the coordinates (−1, 7) which has the same x coordinate as the rightmost column of the current block) positioned on the same horizontal line as the bottommost sample, instead of the bottom left reference pixel.

Further, instead of the top right reference pixel, on the basis of the value of the reference pixel (namely, the reference pixel at the coordinates (−1, 7) which has the same x coordinate as the rightmost column of the current block) adjacent to the bottom right reference pixel, the horizontal prediction value of the bottommost sample may be derived.

Also, the first prediction value of the residual sample except for the edge sample of the current block may be derived using the value of the top reference pixel having the same x-axis coordinate as the rightmost sample or the value of the left reference pixel having the same y-axis coordinate as the bottommost sample.

As another example, when the intra prediction mode of the current block is the planar mode, first intra prediction of the current block is performed using the bottom left reference pixel and the top right reference pixel, but the values of the bottom left reference pixel and the top right reference pixel are set to have the values of the reference pixels respectively adjacent thereto. For example, even when the bottom left reference pixel is available, the value of the bottom left reference pixel is set to have the value of the reference sample (namely, the reference sample having the same y coordinate as the bottommost row of the current block) adjacent thereto. Similarly, even when the top right reference pixel is available, the value of the top right reference pixel is set to have the value of the reference sample (namely, the reference sample having the same x coordinate as the rightmost column of the current block) adjacent thereto.

In the above-described example, as an example of performing first intra prediction, described is the case in which the intra prediction mode of the current block is the planar mode. However, even when the intra prediction mode of the current block is the DC mode or the directional prediction mode, the following embodiment is applicable.

After first intra prediction is performed on the current block, second intra prediction based on filtering may be performed at step S330.

Second intra prediction may be performed on the basis of the reference pixel adjacent to the current block and the first prediction sample derived through first intra prediction. Here, whether to perform second intra prediction may be determined using the intra prediction mode of the current block, the size of the current block, the partition shape of the current block, and the like. For example, second intra prediction is performed only when the intra prediction mode of the current block is the planar mode, but it is not limited thereto.

Second intra prediction of the present invention may be regarded as a process of generating a second prediction sample by applying a weighting filter to the first prediction sample generating through first intra prediction.

Here, the weighting filter is to add or subtract a predetermined compensation coefficient to or from the first prediction sample, or to apply a predetermined weighting to the first prediction sample and the reference pixel. The compensation coefficient may be derived on the basis of a pixel value variation between the reference pixel and the first prediction sample of the current block and/or a pixel value variation between reference pixels. The predetermined weighting may be a fixed constant value pre-defined in a decoder or may be a variable derived on the basis of the spatial distance between the first prediction sample and the reference pixel.

The weighting filter may be applied to the entire region of the current block or may be selectively applied to some regions depending on the intra prediction mode of the current block. For example, the range to which the weighting filter is applied may be applied to the edge sample of the current block. Here, the edge sample may be a sample positioned on the leftmost column and/or topmost row of the current block. As another example, the weighting filter may be applied to the edge sample and even to the first prediction sample adjacent to the edge sample. Alternatively, the weighting filter may only be applied to some rows and/or some columns of the current block.

The range of the reference pixels used in the weighting filter may vary depending on the position of the first prediction sample or may be fixed regardless of the position of the first prediction sample. Hereinafter, in the following embodiments shown in FIGS. 5 and 6, it is assumed that depending on the position of the first prediction sample, the range of the reference pixels used in the weighting filter varies. Hereinafter, the embodiment in which the second prediction sample of the current block is derived by applying the weighting filter will be described in detail with reference to the accompanying drawings. Here, it is assumed that second intra prediction of the current block is performed on the basis of the top reference pixel and the left reference pixel.

Figure 5:
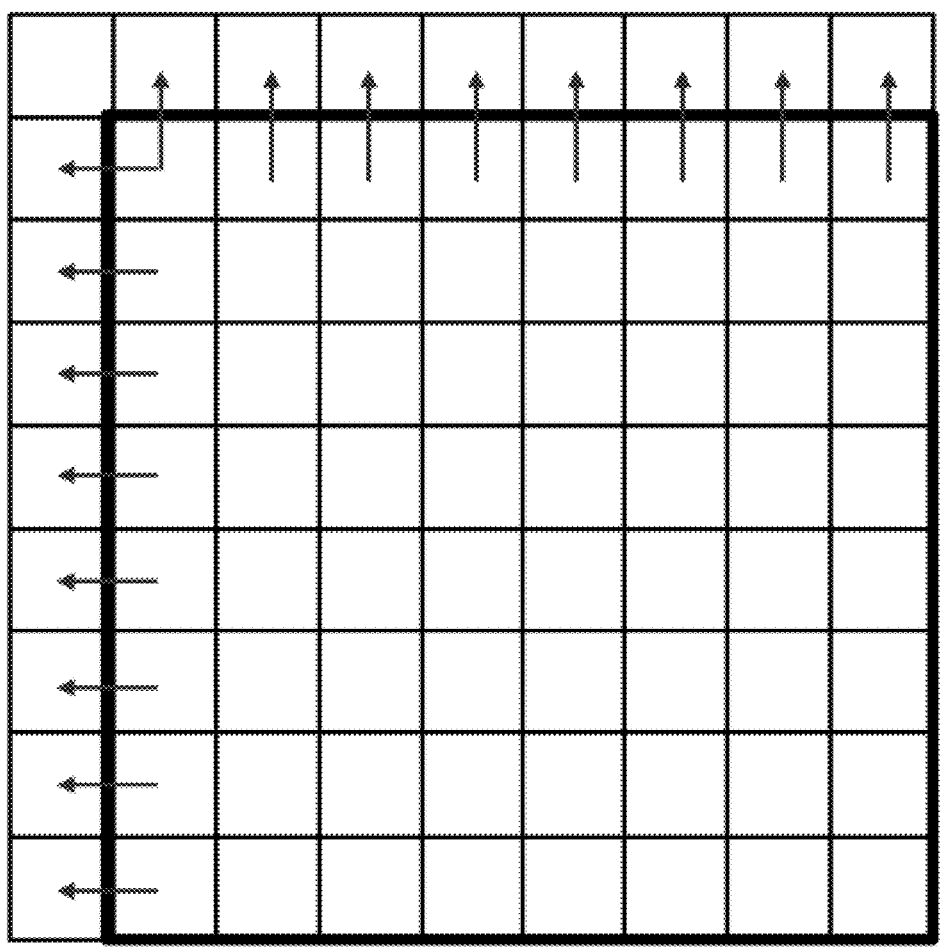
FIGS. 5 and 6 are diagrams illustrating examples of second intra prediction performed on a current block.
Figure 6:
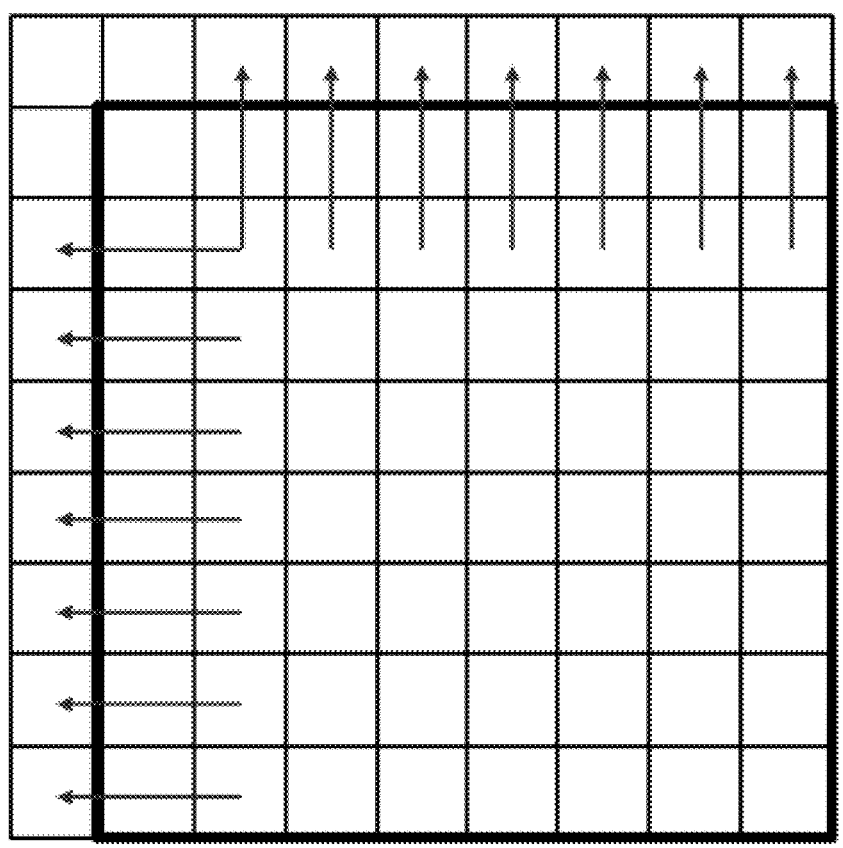

FIGS. 5 and 6 are diagrams illustrating examples of second intra prediction performed on the current block. FIG. 5 is a diagram illustrating an example in which second intra prediction is performed on, among the first prediction samples of the current block, some positioned on the boundary adjacent to the reference pixel. FIG. 6 is a diagram illustrating an example in which second intra prediction is performed on the first prediction samples that are not adjacent to the reference pixel.

On the basis of the diagonal line at a predetermined angle in the current block, the samples positioned at the right of the diagonal are subject to perform second intra prediction based on the top reference pixel, and the samples positioned below the diagonal line are subjected to second intra prediction based on the left reference pixel. The samples positioned on the diagonal of the current block may be subjected to second intra prediction using the top reference pixel and the left reference pixel. When the predetermined angle is 45 degrees, the samples in which the x-axis coordinate value is equal to the y-axis coordinate value correspond to the samples positioned on the diagonal line of the current block. Hereinafter, a sample which is positioned on the diagonal line of the current block is referred to as a diagonal sample.

For example, referring to FIG. 5, on the basis of the top left sample (namely, the diagonal sample at the coordinates (0, 0)) of the current block, the top edge sample positioned at the right of the top left sample may be subjected to second intra prediction using the top reference pixel, and the left edge sample positioned below the top left sample may be subjected to second intra prediction using the left reference pixel. The top left sample positioned on the diagonal line may be subjected to second intra prediction using both the top reference pixel and the left reference pixel.

Even to the samples included in the residual rows or columns except for the leftmost column and the topmost row of the current block, the filter may be applied. For example, on the basis of the diagonal samples of the current block, the sample positioned at the right may be subjected to second intra prediction using the top reference pixel, and the sample positioned below may be subjected to second intra prediction using the left reference pixel. The diagonal sample may be subjected to second intra prediction by using the top reference pixel and the left reference pixel.

For example, referring to FIG. 6, on the basis of the diagonal sample (namely, the sample at the coordinates (1, 1)) in which the x-axis coordinate value and the y-axis coordinate value are one, the samples which are included in the same row as the diagonal sample and are positioned at the right of the diagonal sample may be subjected to second intra prediction using the top reference pixel, and the samples which are included in the same column as the diagonal sample and are positioned below the diagonal sample may be subjected to second intra prediction using the left reference pixel.

Though not shown in FIGS. 5 and 6, the weighting filter may also be applied to a sample with the x or the y coordinate of at least three. Alternatively, the range of samples to which the weighting filter is applied may be variably determined on the basis of the size of the current block, the partition shape of the current block, the prediction mode used in first intra prediction, and the like.

Further, when performing second intra prediction on the current block, the top left reference pixel is used. For example, the second prediction value of the diagonal sample of the current block may be derived on the basis of the left reference pixel, the top reference pixel, and the top left reference pixel.

In the examples shown in FIGS. 5 and 6, described is that second intra prediction is performed on the basis of the top reference pixel and the left reference pixel adjacent to the current block. Unlike the examples, only one of the top reference pixel and the left reference pixel adjacent to the current block is used in performing second intra prediction.

Here, the range of the reference pixels used in second intra prediction may be determined depending on the intra prediction mode of the current block, the size of the current block, the partition shape of the current block, and the like.

For example, when the intra prediction mode of the current block is the non-directional mode (for example, the planar mode), second intra prediction is performed using at least one of the left reference pixel and the top reference pixel depending on the position of the target sample, as in the examples shown in FIGS. 5 and 6. In contrast, when the intra prediction mode of the current block is the directional mode (for example, the vertical direction mode or the horizontal direction mode), second intra prediction is performed only using the left reference pixel or the top reference pixel regardless of the position of the target sample.

The weighting filter used in second intra prediction is to assign a weighting to the value of the first prediction sample derived through first intra prediction with respect to the reference pixel adjacent to the current block. Here, the filter coefficient of the filer applied to each sample may be a fixed constant value or may be a variable that varies depending on the position of the first prediction sample.

For example, the coefficient of the weighting filter may be a variable that increases or decreases in proportion to the distance between the first prediction sample and the reference pixel.

Equation 3 below shows an example of Equation of deriving the second prediction value (namely, the value of the second prediction sample) of the sample included in the topmost row of the current block (namely, the first row of the current block) and the leftmost column of the current block (namely, the first column of the current block).

$$predSamples(0, 0) = \qquad\qquad\qquad\qquad\text{[Equation 3]}$$
$$(p(-1, 0) + p(0, -1) + 2p(0, 0) + 2) >> 2$$
$$predSamples(x, 0) = (p(x, -1) + 3p(x, 0) + 2) >> 2; x > 0$$
$$predSamples(0, y) = (p(-1, y) + 3p(0, y) + 2) >> 2; y > 0$$

In Equation 3, described is that: with respect to the sample (namely, the leftmost sample on the topmost row or the topmost sample on the leftmost column) positioned at the top left in which the topmost row and the leftmost column of the current block overlap each other, the filter coefficients are [1, 2, 1]; with respect to the sample included in the leftmost column of the current block except for the diagonal sample of the top left, the filter coefficients are [3, 1]; and with respect to the sample included in the topmost row of the current block except for the diagonal sample of the top left, the filter coefficients are [3, 1].

Equation 4 below shows an example of deriving the second prediction value of the sample included in the second row or the second column of the current block.

$$predSamples(1, 1) = \qquad\qquad\qquad\qquad\text{[Equation 4]}$$
$$(p(-1, 0) + p(0, -1) + 3p(0, 0) + 2) >> 2$$
$$predSamples(x, 1) = (p(x, -1) + 4p(x, 0) + 2) >> 2; x > 1$$
$$predSamples(1, y) = (p(-1, y) + 4p(0, y) + 2) >> 2; y > 1$$

In Equation 4, described is that: with respect to the diagonal sample at the coordinates (1, 1), filter coefficients are [1, 3, 1]; with respect to the sample included in the second row of the current block and positioned at the right of the diagonal sample, the filter coefficients are [4, 1]; and with respect to the sample included in the second column of the current block and positioned below the diagonal sample, the filter coefficients are [4, 1].

As shown in Equations 3 and 4, with respect to the samples positioned at the right of (or above) the diagonal sample, the further the distance from the top reference pixel, the greater the weighting from the first prediction value of the sample. With respect to the samples positioned at the left of (or below) diagonal sample, the further the distance from the left reference pixel, the greater the weighting for the first prediction value of the sample.

The range to which the filter is applied within the current block may be limited to some rows or some columns of the current block. For example, the filter may be applied to the first row and the first column of the current block, the filter may be applied from the first row to the N-th row of the current block, or the filter may be applied from the first column to the M-th column.

Here, the application range of the filter may be determined depending on the intra prediction mode of the current block, the size of the current block, the partition shape of the current block, and the like.

For example, when the prediction mode of the current block is the non-directional mode (for example, the planar mode), the filter is applied only to the first row and the first column of the current block. When the prediction mode of the current block is the directional mode, the filter is applied from the first row to the N-th row of the current block or the filter is applied from the first column to the M-th column.

When the filter is applied to some of the current block, the value (namely, the second prediction value) of the second prediction sample to which the filter is not applied is set to be equal to the value (namely, the first prediction value) of the first prediction sample.

When the current block include multiple sub-block s, first intra prediction and second intra prediction are performed on a per-sub-block basis. Here, first intra prediction and second intra prediction may be performed in the same or different order.

When first intra prediction and second intra prediction are performed on a per-sub-block basis, at least one of first intra prediction and second intra prediction is performed in a predetermined order.

The order of performing at least one of first intra prediction and second intra prediction may be determined depending on the intra prediction mode of the current block. This will be described in detail with reference to FIG. 7.

Figure 7:
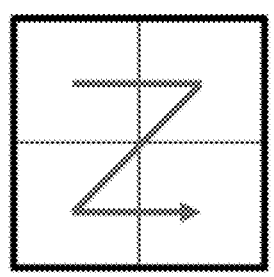
FIG. 7 is a diagram illustrating intra prediction order according to an intra prediction mode of a current block.
Figure 7:
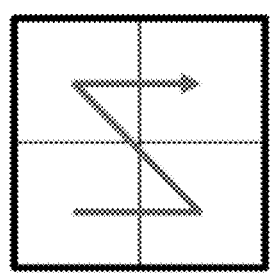
Figure 7:
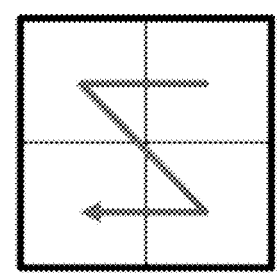

FIG. 7 is a diagram illustrating intra prediction order according to the intra prediction mode of the current block. For convenience of description, it is assumed that first intra prediction and second intra prediction are performed in the same order.

When the intra prediction mode of the current block is the non-directional mode or one of the horizontal direction mode and the vertical direction mode (for example, when the intra prediction mode corresponds to 10~26), intra prediction of the current block is performed in the order of the "Z" shape starting from the top left sub-block as shown in FIG. 7(a).

When the intra prediction mode of the current block is the directional mode and the intra prediction mode has a smaller number than the horizontal direction mode (for example, when the intra prediction mode corresponds to 2~9), intra prediction of the current block is performed in the order of the reverse-Z shape starting from the bottom left sub-block as shown in FIG. 7(b).

When the intra prediction mode of the current block is the directional mode and the intra prediction mode has a larger number than the vertical direction mode (for example, when the intra prediction mode corresponds to 27~34), intra prediction of the current block is performed in the reverse-Z order starting from the top right sub-block as shown in FIG. 7(c).

Referring to FIG. 3, when the second prediction sample of the current block is derived through first intra prediction and second intra prediction, the reconstructed sample of the current block is derived by adding the residual sample to the second prediction sample at step S340.

The residual sample may be derived by selectively performing at least one of inverse quantization and inverse transform on the transform coefficient (or the residual coefficient) of the current block obtained from the bitstream. Here, as transform types for inverse transform, DCT, DST, KLT, and the like may be used. Here, one of the transform types may be selectively used considering the prediction mode of the current block, the size of the current block (for example, the PU and the TU), the luma/chroma component, and the like.

An in-loop filter may be applied to the reconstructed sample derived by adding the second prediction sample and the residual sample at step S350. The in-loop filter may include at least one of the deblocking filter, a sample adaptive offset (SAO) filter, and an adaptive loop filter (ALF).

The components described in the exemplary embodiments of the present invention may be achieved by at least one of a digital signal processor (DSP), a processor, a controller, an application specific integrated circuit (ASIC), a programmable logic element such as a field programmable gate array (FPGA), other electronic devices, and combinations thereof.

Alternatively, at least one of the functions or the processes described in the exemplary embodiments of the present invention may be achieved by software, and the software may be recorded on a recording medium. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language code formatted by a compiler but also a high level language code that may be implemented by a computer using an interpreter, and the like. The hardware devices may be configured to be operated by one or more software modules or vice versa to conduct the processes according to the present invention. Components, functions, processes, and the like according to the embodiments of the present invention may be implemented in the form of a combination of hardware and software.

Although the invention is described with reference to specific items such as specific structural elements, to merely some embodiments, and to drawings, such specific details disclosed herein are only representative for purposes of helping more comprehensive understanding of the present invention. The present invention, however, is not limited to only the example embodiments set forth herein, and those skilled in the art will appreciate that the present invention can be embodied in many alternate forms.

Accordingly, the present invention is intended to cover not only the exemplary embodiments, but also various alternatives, modifications, equivalents and other embodiments that may be included within the spirit and scope of the present invention as defined by the appended claims.

INDUSTRIAL APPLICABILITY

The present invention may be used in encoding/decoding an image.

The invention claimed is:

1. A video decoding method, comprising:
    determining an intra prediction mode of a current block;
    generating prediction pixels in the current block by performing a DC intra prediction on the current block based on at least one of neighboring pixels of the current block in response to the intra prediction mode of the current block being a DC mode; and
    filtering a prediction pixel in the current block by a weighting filter,
    wherein, the filtered prediction pixel by the weighting filter is determined based on a weighted sum of the top reference pixel, the left reference pixel and the prediction pixel,
    the left reference pixel of the prediction pixel is included in a same row as the prediction pixel and the top reference pixel of the prediction pixel is included in a same column as the prediction pixel,
    the prediction pixel is filtered by the weighting filter in response to that at least one of a first weight for the top reference pixel and a second weight for the left reference pixel is greater than zero,
    the first weight is determined to be zero in response to that a distance from the top reference pixel is greater than a predetermined value and the second weight is determined to be zero in response to that a distance from the left reference pixel is greater than the predetermined value, and
    the predetermined value is
    determined based on a size of the current block.

2. The video decoding method of claim 1, wherein whether to apply the weighting filter is determined based on at least one of the intra prediction mode of the current block and a partition type of the current block.

3. The method of claim 1, wherein the weighting filter is applied based on weights of the weighting filter, and
    wherein the second weight for the left reference pixel is derived based on a distance between the prediction pixel and the left reference pixel, and the first weight for the top reference pixel is derived based on a distance between the prediction pixel and the top reference pixel.

4. The video decoding method of claim 1, wherein the left reference pixel and the top reference pixel are included in the neighboring pixels.

5. The video decoding method of claim 1, wherein a range of the reference pixels is determined based on at least one of the intra prediction mode of the current block, a size of the current block, and a shape of the current block.

6. A video encoding method, comprising:
    determining an intra prediction mode of a current block;
    generating prediction pixels in the current block by performing a DC intra prediction on the current block based on at least one of neighboring pixel of the current block in response to the intra prediction mode of the current block being a DC mode; and
    filtering a prediction pixel in the current block by a weighting filter,
    wherein, the filtered prediction pixel by the weighting filter is determined based on a weighted sum of the top reference pixel, the left reference pixel and the prediction pixel,
    the left reference pixel of the prediction pixel is included in a same row as the prediction pixel and the top reference pixel of the prediction pixel is included in a same column as the prediction pixel,
    the prediction pixel is filtered by the weighting filter in response to that at least one of a first weight for the top reference pixel and a second weight for the left reference pixel is greater than zero,
    the first weight is determined to be zero in response to that a distance from the top reference pixel is greater than a predetermined value and the second weight is determined to be zero in response to that a distance from the left reference pixel is greater than the predetermined value, and
    the predetermined value is
    determined based on a size of the current block.

7. The video encoding method of claim 6, wherein whether to apply the weighting filter is determined based on at least one of the intra prediction mode of the current block and a partition type of the current block.

8. The method of claim 6,
    wherein the second weight for the left reference pixel is derived based on a distance between the prediction pixel and the left reference pixel, and the first weight for the top reference pixel is derived based on a distance between the prediction pixel and the top reference pixel.

9. The video encoding method of claim 6, wherein the left reference pixel and the top reference pixel are included in the neighboring pixels.

10. The video encoding method of claim 6, wherein a range of the reference pixels is determined based on at least one of the intra prediction mode of the current block, a size of the current block, and a shape of the current block.

11. A computer-readable recording medium storing a bitstream which is received and decoded by a video decoding method to reconstruct an image,
    wherein the bitstream comprises information indicating an intra prediction mode of a current block,
    the video decoding method configured to:
        determine an intra prediction mode of a current block based on the formation indicating an intra prediction mode of a current block;
        generate prediction pixels in the current block by performing a DC intra prediction on the current block based on at least one of neighboring pixels of the current block in response to the intra prediction mode of the current block being a DC mode; and
        filter a prediction pixel in the current block by a weighting filter, and
    wherein, the filtered prediction pixel by the weighting filter is determined based on a weighted sum of the top reference pixel, the left reference pixel and the prediction pixel,
    the left reference pixel of the prediction pixel is included in a same row as the prediction pixel and the top reference pixel of the prediction pixel is included in a same column as the prediction pixel, the prediction pixel is filtered by the weighting filter in response to that at least one of a first weight for the top reference pixel and a second weight for the left reference pixel is greater than zero, the first weight is determined to be zero in response to that a distance from the top reference pixel is greater than a predetermined value and the second weight is determined to be zero in response to that a distance from the left reference pixel is greater than the predetermined value, and the predetermined value is, determined based on a size of the current block.

* * * * *